US011594159B2

(12) United States Patent
Atkins et al.

(10) Patent No.: US 11,594,159 B2
(45) Date of Patent: Feb. 28, 2023

(54) DISPLAY MANAGEMENT WITH AMBIENT LIGHT COMPENSATION

(71) Applicant: Dolby Laboratories Licensing Corporation, San Francisco, CA (US)

(72) Inventors: Robin Atkins, Vancouver (CA); Craig Todd, Mill Valley, CA (US); Jaclyn Anne Pytlarz, Santa Clara, CA (US); Timo Kunkel, Kensington, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/421,972

(22) PCT Filed: Jan. 9, 2020

(86) PCT No.: PCT/US2020/012963
§ 371 (c)(1),
(2) Date: Jul. 9, 2021

(87) PCT Pub. No.: WO2020/146655
PCT Pub. Date: Jul. 16, 2020

(65) Prior Publication Data
US 2022/0114928 A1 Apr. 14, 2022

Related U.S. Application Data

(60) Provisional application No. 62/790,058, filed on Jan. 9, 2019.

(30) Foreign Application Priority Data

Jan. 9, 2019 (EP) ..................................... 19150873

(51) Int. Cl.
*G09G 3/00* (2006.01)
*G02B 5/20* (2006.01)

(52) U.S. Cl.
CPC ............. *G09G 3/002* (2013.01); *G02B 5/208* (2013.01); *G09G 2360/10* (2013.01); *G09G 2360/144* (2013.01)

(58) Field of Classification Search
None
See application file for complete search history.

(56) References Cited

U.S. PATENT DOCUMENTS 7,166,829 B2 1/2007 De Brabander
7,697,053 B2 4/2010 Kurtz
(Continued)

FOREIGN PATENT DOCUMENTS

CN 102183869 B 6/2012
CN 102301412 B 4/2014
(Continued)

OTHER PUBLICATIONS

Author Unavailable "Calibrating displays with built-in ambient light sensing" published May 6, 2016.

*Primary Examiner* — Chad M Dicke (57) ABSTRACT

A display apparatus, a display management module and a method for ambient light compensation are described. The display management module is configured to receive an input video signal comprising a sequence of video frames and to determine whether a current video frame of the sequence of video frames immediately follows a scene change. The display management module is further configured to adjust ambient light compensation applied to the input signal in dependence on the signal indicative of intensity of ambient light only in response to determining that the current video frame of the sequence of video frames immediately follows a scene change.

12 Claims, 6 Drawing Sheets

(56) References Cited

U.S. PATENT DOCUMENTS

| | | |
|---|---|---|
| 7,973,779 B2 | 7/2011 | Masalkar |
| 8,004,502 B2 | 8/2011 | Keam |
| 8,508,508 B2 | 8/2013 | Newton |
| 8,624,822 B2 | 1/2014 | Uehara |
| 8,836,866 B2 | 9/2014 | Haastrup |
| 8,872,093 B2 | 10/2014 | Lee |
| 9,047,807 B2 | 6/2015 | Kwong |
| 9,336,749 B2 | 5/2016 | Vetsuypens |
| 9,645,386 B2 | 5/2017 | Lau |
| 9,671,643 B2 | 6/2017 | Woestenborghs |
| 2004/0075045 A1 | 4/2004 | Hermsen |
| 2004/0196250 A1 | 10/2004 | Mehrotra |
| 2006/0151678 A1 | 7/2006 | Shibata |
| 2008/0284716 A1 | 11/2008 | Edwards |
| 2010/0253660 A1 | 10/2010 | Hashimoto |
| 2011/0175925 A1* | 7/2011 | Kane ............... G01J 1/4204 345/589 |
| 2012/0182276 A1 | 7/2012 | Kee |
| 2013/0076712 A1 | 3/2013 | Zheng |
| 2013/0125155 A1 | 5/2013 | Bhagavathy |
| 2013/0278578 A1 | 10/2013 | Vetsuypens |
| 2014/0176444 A1 | 6/2014 | Sultenfuss |
| 2014/0210802 A1 | 7/2014 | Myers |
| 2014/0295948 A1* | 10/2014 | Helgesen ............... G07F 17/322 463/25 |
| 2014/0307008 A1* | 10/2014 | Delfs ................ G09G 3/3406 345/690 |
| 2014/0312234 A1* | 10/2014 | Tan ................ G01J 1/4204 250/208.5 |
| 2014/0368420 A1 | 12/2014 | Nishio |
| 2015/0102729 A1 | 4/2015 | Creasman |
| 2016/0071485 A1* | 3/2016 | Tripathi ............... G09G 5/36 345/589 |
| 2016/0198225 A1 | 7/2016 | Reznik |
| 2016/0363765 A1 | 12/2016 | Haefner |
| 2017/0084250 A1 | 3/2017 | Jia |
| 2017/0316762 A1 | 11/2017 | El-Ghoroury |
| 2019/0189681 A1* | 6/2019 | Chae ................ H01L 25/0753 |

FOREIGN PATENT DOCUMENTS

| | | |
|---|---|---|
| CN | 109067967 A | 12/2018 |
| CN | 104916269 B | 3/2019 |
| EP | 3079141 A1 | 10/2016 |
| WO | 1999004562 A1 | 1/1999 |
| WO | 2011106247 | 9/2011 |
| WO | 2014130343 | 8/2014 |
| WO | 2018152063 | 8/2018 |

* cited by examiner

DISPLAY MANAGEMENT WITH AMBIENT LIGHT COMPENSATION

CROSS-REFERENCE TO RELATED APPLICATIONS

This application claims the benefit of priority to U.S. Provisional Patent Application No. 62/790,058, filed Jan. 9, 2019, and to European Patent Application No. 19150873.8, filed Jan. 9, 2019, each of which is hereby incorporated by reference in its entirety.

TECHNICAL FIELD

The present disclosure generally relates to video technology. More particularly, embodiments of the present disclosure relate to the display of video signals in a viewing environment with variable ambient light.

BACKGROUND

In a typical content creation pipeline, video is color graded in a low light ambient environment, typically with 5 nits ambient for color grading High Dynamic Range (HDR) video and 10 nits ambient for color grading Standard Dynamic Range (SDR) video. In practice, viewers may display content in a variety of ambient environments, say, at 0-5 nits (e.g., watching a movie in a relatively dark home theater), at 100-150 nits (e.g., watching a movie in a relatively bright living room), or higher (e.g., watching a movie on a tablet in a very bright room or outside, in daylight).

As appreciated by the inventors here, improved techniques are desired for displaying video to compensate for ambient light conditions in a viewing environment.

SUMMARY

Embodiments of the present disclosure relate to a display management (DM) module and a corresponding method.

In an embodiment, a DM module is configured to receive an input video signal comprising a sequence of video frames, and a signal indicative of intensity of ambient light. The DM module is further configured to determine whether a current video frame of the sequence of video frames immediately follows a scene change. The DM module is further configured to transform the input video signal to an output video signal adapted for a target display apparatus. Transforming the input video signal to the output signal includes applying ambient light compensation to the input video signal in dependence on the signal indicative of the intensity of ambient light. The output video signal is output by the DM module for use by the target display apparatus. The DM module is configured to adjust said ambient light compensation applied to the input signal in dependence on the signal indicative of intensity of ambient light only in response to determining that the current video frame of the sequence of video frames immediately follows a scene change.

Further embodiments of the present disclosure relate to a display apparatus including said DM module, an ambient light sensor and a display, and to a computer program for executing said method.

BRIEF DESCRIPTION OF THE DRAWINGS

Embodiments of the present invention are illustrated by way of example, and not by way of limitation, in the accompanying drawings, wherein like reference numerals refer to similar elements, and in which.

DETAILED DESCRIPTION

Numerous specific details are described below to provide a thorough understanding of the present invention. However, the present invention may be practiced without these specific details. In addition, well-known parts may be described in less exhaustive detail. The figures are schematic and comprise parts relevant for understanding the present disclosure, whereas other parts may be omitted or merely suggested.

Figure 1A:
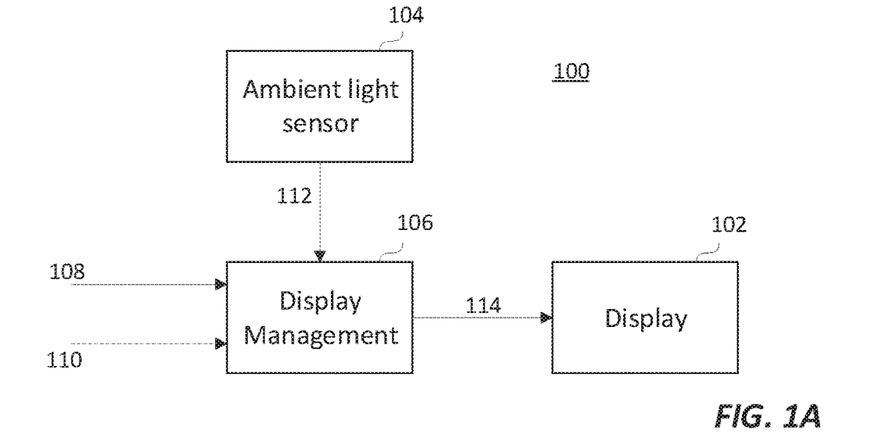
FIG. 1A-C show schematic diagrams of exemplary display apparatuses.
Figure 1B:
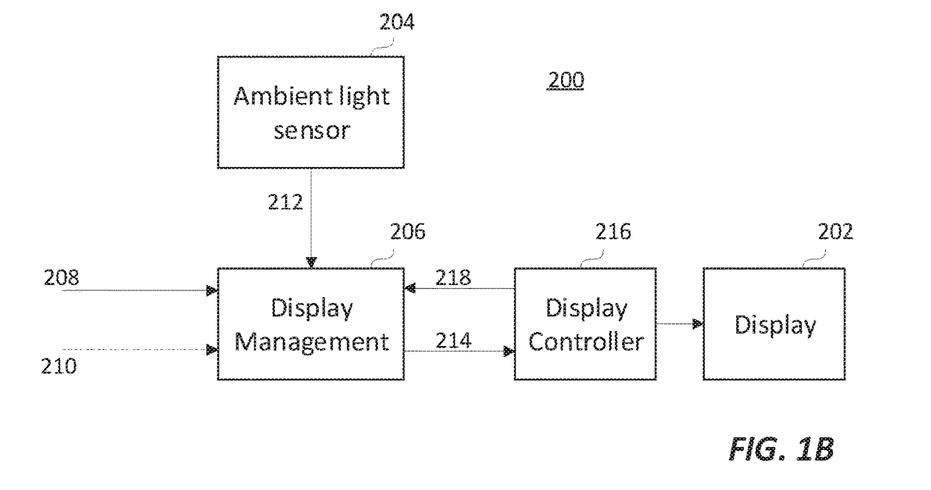
Figure 1C:
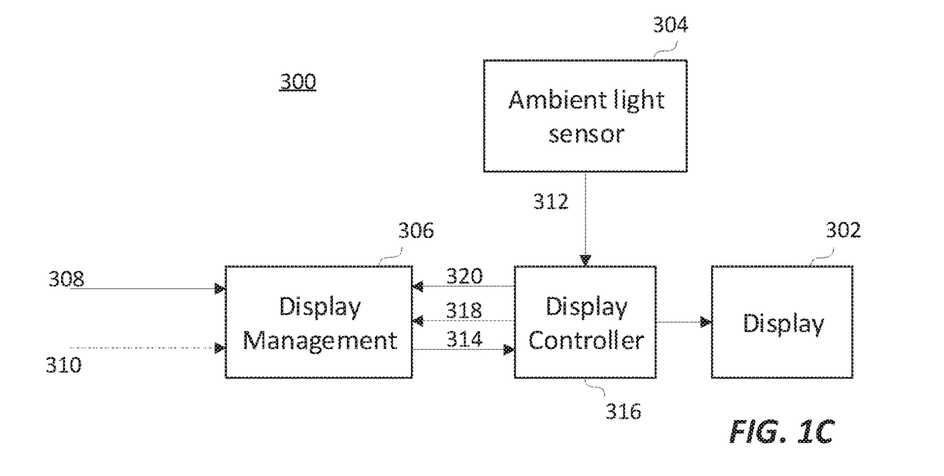

FIGS. 1A-C show examples of display apparatuses 100, 200, 300 that apply ambient light compensation. In the context of this disclosure, a display apparatus may for example comprise a television, a laptop, a tablet, a smartphone, a projector or any other electronic device for displaying video.

As used herein, the term 'dynamic range' (DR) may relate to a capability of the human visual system (HVS) to perceive a range of intensity (e.g., luminance, luma) in an image, e.g., from darkest grays (darks or blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term "display management" denotes the process of adapting images or pictures (e.g. frames) of an input video signal for a target display apparatus. Display management may comprise mapping images or pictures of an input video signal of a first dynamic range (e.g., 1000 nits) to a display apparatus having a second dynamic range (e.g., 500 nits). Display management may comprise tone mapping and/or gamut mapping.

Display apparatus 100 (FIG. 1A) comprises a display 102, an ambient light sensor 104 and a display management (DM) module 106. In this example, the ambient light sensor 104 communicates with the DM module 106, and the DM module 106 communicates with the display 102. The DM module 106 receives an input video signal 108 comprising a sequence of video frames. Optionally, the DM module 106 further receives metadata 110 related to the input video signal 108. For example, the DM module 106 may receive the input video signal 108 and metadata 110 from a decoder, internal or external to apparatus 100.

The DM module 106 receives a signal 112 indicative of ambient light from sensor 104. The signal is at least indicative of intensity of ambient light registered by the sensor 104. Optionally, the signal may further be indicative of a color of ambient light registered by the sensor.

Typically, the sensor 104 is positioned on a front side of the apparatus 100, that corresponds to the front side of the display 102, to measure the illumination on the display screen, which is the ambient component that elevates the black level of the display as a function of reflectivity. In such a scenario, the sensor 104 measures the intensity, and optionally the color, of light present at the front side of the display 102. However, the present disclosure is not limited to a particular position of the sensor 104, and alternatively the sensor 104 may be positioned at a different location, e.g. along the edge of the display apparatus or on the back of the apparatus.

In the examples of the drawings, a single sensor 104 is shown. However, the present disclosure is not limited to the use of a single sensor, and multiple sensors 104 may be used to generate a signal 112 indicative of ambient light for use by the DM module 106.

The DM module 106 is configured to transform the input video signal 108 to an output video signal 114 adapted for display 102. The transformation may comprise tone mapping, e.g. for adjusting the dynamic range of the input signal 108 to the dynamic range supported by the display 102, and/or gamut mapping e.g. for adjusting the colors of the input signal 108 to the color gamut supported by the display 102.

The optional metadata 110 may include parameters for the tone mapping and/or the gamut mapping operations. The DM module 106 may thus adjust the tone mapping and/or the gamut mapping operations to be applied to the input video signal 108 based on metadata 108. The tone mapping and/or the gamut mapping may further use parameters relating to the characteristics of the display 102, which may be stored internally in apparatus 100 and are thus accessible by DM module 106.

An example of display management including tone mapping is described in PCT/US2014/016304, entitled "Display management for high dynamic range video", which is hereby incorporated by reference in its entirety. PCT/US2014/016304 describes a tone mapping curve that maps input luma values to output luma values according to $$Y_{out} = \left(\frac{C_1 + C_2 Y_{in}^n}{1 + C_3 Y_{in}^n}\right)^m,$$

wherein $C_1$, $C_2$ and $C_3$ are constants, Yin is the input luma value, $Y_{out}$ is the output luma value and n and m are parameters. $C_1$, $C_2$ and $C_3$ are based on the brightness characteristics of the reference (or source) display and on the brightness characteristics of the target display. The brightness characteristics of the reference (or source) display are typically extracted from input metadata, e.g. a minimum brightness ($S_{min}$), an average or mid value ($S_{mid}$) and a maximum brightness ($S_{max}$). The brightness characteristics of the target display, e.g. a minimum brightness ($T_{min}$), an average or mid value ($T_{mid}$) and a maximum brightness ($T_{max}$), are typically stored internally in the display apparatus and are therefore accessible by the DM module. The parameters $S_{min}$, $S_{mid}$, $S_{max}$, $T_{min}$, $T_{mid}$, $T_{max}$ define three anchor points of the tone mapping curve, namely ($S_{min}$, $T_{min}$), ($S_{mid}$, $T_{mid}$), ($S_{max}$, $T_{max}$), the three anchor points in turn determining the value of the constants $C_1$, $C_2$ and $C_3$.

A further example of display management including tone mapping is described in PCT/US2018/017830, entitled "Tone mapping for high dynamic range images", which is hereby incorporated by reference in its entirety. PCT/US2018/017830 describes a tone mapping curve that uses the same three anchor points, but has four segments in total: a first linear segment for values lower than ($S_{min}$, $T_{min}$), a first spline from ($S_{min}$, $T_{min}$) to ($S_{mid}$, $T_{mid}$), a second spline from ($S_{mid}$, Lila) to ($S_{max}$, $T_{max}$) and a second linear segment for values larger than ($S_{max}$, $T_{max}$).

Other examples of display management including tone mapping are described in PCT/US2011/025366, entitled "Display management methods and apparatus", which is hereby incorporated by reference in its entirety.

The transformation performed by DM module 106 may further comprise applying ambient light compensation to the input video signal 108. The ambient light compensation is applied in response to the signal 112 indicative of at least the intensity of the ambient light, as received from sensor 104. The DM module 106 applies the ambient light compensation to the input signal 108, e.g. in addition to a tone mapping operation, to thereby generate the output video signal 114 for rendering by the display 102. The ambient light compensation may be applied prior to or after applying a tone mapping and/or a gamut mapping. In another example, the ambient light compensation is combined with the tone mapping and/or gamut mapping into a single mapping operation. In such an example, the mapping applied by the DM module 106 to the input video signal 108 has parameters that depend on the signal 112, and parameters related to the tone mapping and/or gamut mapping, that may e.g. be included or derived from metadata 110 or derived from the input video signal 108 itself.

The DM module 106 is further configured to determine whether a current video frame of the input video signal 108 immediately follows a scene change (also known as "scene cut").

In other words, DM module 106 may be configured to determine whether a current video frame starts a new scene, said new scene following a previous scene that includes the video frame immediately preceding the current video frame.

A scene comprises a set of consecutive video frames having similar brightness characteristics and/or similar color characteristics. Scenes may be defined during authoring of the video. For example, scene changes may be included in an Edit Decision List (EDL) which was used, e.g. by the director and/or editor, to create the movie from a number of different shots. An indication of these scene changes may be included in the metadata of the video signal.

Therefore, in an embodiment, metadata 110 comprises metadata indicating a scene change. DM module 106 is configured to determine whether a current video frame of the sequence of video frames included in video signal 108 follows a scene change using the metadata indicating the scene change. For example, the metadata may comprise frame-by-frame metadata including a flag that indicates whether the current frame immediately follows a scene change, i.e. whether the current frame is the first frame of a new scene. In another example, the metadata comprise frame-by-frame metadata including an identifier that identifies a scene, e.g. a scene number, with which the respective frame is associated. In such a scenario, the DM module 106 may determine whether a current video frame is in a different scene than a video frame immediately preceding the current video frame, by comparing the scene identifier of the current frame with the scene identifier of the previous frame. If the scene identifiers of the two consecutive video frames differ, then it is determined that the current video frame immediately follows a scene change.

In another embodiment, a scene change is determined by the DM module 106 by comparing characteristics of the current video frame to characteristics of one or more previous video frames. For example, the characteristics may comprise brightness characteristics and/or color characteristics.

In an example, the DM module 106 determines whether a variation of the characteristics between the current frame and the previous frame satisfies a predetermined threshold condition, e.g. exceeds a predetermined threshold. If the variation satisfies the threshold condition, then the DM module 106 determines that a scene change occurs between the current video frame and the previous video frame, i.e. the current scene immediately follows a scene change.

In another example, the DM module 106 determines for each frame j the average luminance value $<I_j>$, and compares the difference between the average luminance value of the current frame $<I_j>$ and the average luminance value of the previous frame $<I_{j-1}>$ with a threshold T. If the difference $|<I_j>-<I_{j-1}>|$ exceeds the threshold T, i.e. $|<I_j>-<I_{j-1}>|>T$, then the DM module 106 determines that the current frame immediately follows a scene change. Instead of the average luminance value, a different function of the luma values of the frame may be used. For example, instead of the average luminance value, a mid luminance value may be used, that may e.g. be computed as the mean of the maximum luminance value ($I_{max}$) and the minimum value ($I_{min}$) of the video frame, i.e. ($I_{max}+I_{min}$)/2.

In a further example, the characteristics of the video frames are derived from metadata indicative of said characteristics. For example, referring to the examples of the previous paragraph, the mid luminance value or the average luminance value may be available as frame-by-frame metadata included in the metadata 110 received by the DM module 106, e.g. in the form of the metadata value $S_{mid}$ described above.

In another embodiment, DM module 106 is capable of both determining a scene change based on said metadata indicating a scene change and determining a scene change by said comparison of characteristics of the current video frame with characteristics of one or more previous video frames. In a further example of this embodiment, the DM module 106 is configured to—in presence of metadata indicating a scene change—base the determination of the scene change on said metadata instead of determination by said comparison. An advantage of metadata indicating a scene change overruling automatic detection by the DM module 106 is that the display management process more closely follows the creator's intent.

In FIGS. 1B and 1C, elements that are similar to elements of FIG. 1A have been given the same reference numeral, increased by 100 or 200, respectively. Those elements have the same characteristics, configuration and functionality as described with respect to FIG. 1A, unless described otherwise in the description below.

Display apparatus 200 (FIG. 1B) differs from display apparatus 100 in that it comprises a display controller 216, which controls the operation of the display 202. The DM module 206 communicates with the display controller 216, and the display controller communicates with the display 202. The DM module 206 receives input video signal 208 that comprises a sequence of video frames. Further, the DM module 206 optionally receives metadata 210, e.g. including metadata for dynamic range mapping and/or metadata indicating a scene change. The DM module 206 receives from display controller 216 information 218 on the characteristics of the display 202.

In an example, information 218 comprises brightness characteristics of the target display, e.g. a minimum brightness (min), an average or mid value (mid) and a maximum brightness (max), for use by the DM module 206 in tone mapping. In this example, the DM module 206 applies a tone mapping to the input video signal 208 based on source brightness characteristics (e.g. $S_{min}$, $S_{mid}$, $S_{max}$) included in metadata 210, and target brightness characteristics (e.g. $T_{min}$, $T_{mid}$, $T_{max}$) included in or derivable from information 218 received from the display controller 216. In addition, the DM module 206 receives from ambient light sensor 204 a signal 212 indicative of intensity of ambient light (and optionally indicative of color of ambient light), and applies ambient light compensation in dependence on signal 212. The DM module 206 transmits the tone mapped (and optionally gamut mapped) and ambient light compensated output video signal 214 to the display controller 216. The display controller 216 controls the display 202 to render the output signal 214.

Instead of using metadata 210 to determine the source brightness characteristics, these characteristics may be determined by the DM module 206 by analyzing the video signal 208, e.g. by determining the min, mid and max value of one or more images of the video signal 208. Further, as described above in relation to display apparatus 100, instead of using optional metadata 210 a scene change may be determined by the DM module 206 of display apparatus 200 by comparing characteristics of the current video frame to characteristics of one or more previous video frames.

In an example, display 202 comprises a backlight. For example, display 202 may be an LCD type display. In this scenario, the display controller 216 is configured to control the backlight of the LCD display based on the video signal 214 received from the DM module 206. In other examples, display 202 may not include a backlight. For example, display 202 may be an OLED type display.

Display apparatus 300 (FIG. 1C) differs from display apparatus 200 in that the ambient light sensor 304 communicates with display controller 316, instead of with DM module 306. The display controller 316 receives signal 312 indicative of intensity of ambient light from sensor 304. The display controller 316 transmits information 320 on the intensity of ambient light (and optionally information on the color of ambient light) to the DM module 306. In the example shown, the signal 312 of sensor 304 is passed on to DM module 306. Alternatively, the display controller 316 may process the signal 312 of sensor 304 to generate a parameter indicative of the intensity of ambient light, and communicate said parameter to DM module 306.

Like in FIG. 1B, also in FIG. 1C the display controller 316 communicates information on the characteristics of display 302 to DM module 306, e.g. brightness characteristics are communicated for a tone mapping operation of DM module 306. DM module 306 applies a tone mapping operation and ambient light compensation to input video signal 308, wherein the tone mapping operation is controlled via the parameters of source characteristics included in metadata 310 (or determined by the DM module 306 directly from the video signal 308) and parameters of the characteristics of the display 302 included in signal 318, and wherein the ambient light compensation is applied in dependence on the signal 320 indicative of intensity of ambient light received from display controller 316.

Display apparatuses 100, 200 and 300 comprise displays 102, 202, 302. In some embodiments, a display apparatus 100, 200, 300 may comprise a projector instead of a display. For example, the projector comprises a laser projector.

In the above embodiments, ambient light sensors 104, 204, 304 are depicted as being part of the display apparatus 100, 200, 300. Alternatively, the ambient light sensor may be external to the display apparatus 100, 200, 300, in which case the DM module 106, 206, 306 is configured to receive a signal indicative of the intensity of ambient light from the external ambient light sensor, e.g. via a wired or wireless connection 112, 212, 312.

As ambient light is typically not constant over time, also the signals 112, 212, 320 indicative of intensity of ambient light will typically vary over time. However, compensating for the instantaneous ambient light may result in "flicker": noticeable rapid fluctuations of the brightness of the displayed image. Measurement noise inherent to ambient light sensors may for example lead to adjusting the brightness in response to the measured ambient light intensity, even when the intensity of ambient light has not actually changed. In another example, if the ambient light sensor is momentarily blocked, e.g. by a person standing in front of the ambient light sensor, the brightness may go down significantly, only to be ramped up again immediately after the person steps away and no longer blocks the sensor.

In the embodiments of FIGS. 1A-C, the DM modules 106, 206, 306 are configured to adjust the ambient light compensation only in response to determining that the current video frame of the sequence of video frames immediately follows a scene change. In other words, adjustment of ambient light compensation is synchronized with scene changes of the input video signal. The inventors have found that adjusting the ambient light compensation is not noticeable to viewers when restricting the adjustment to scene changes. In a typical video, scene changes occur every 1 to 5 seconds. The inventors have found that even when adjusting the ambient light compensation every 1 to 5 seconds, the changes in ambient light compensation are not noticeable if the adjustments are restricted to scene changes. Therefore, by synchronizing the ambient light adjustment to scene changes, flicker is avoided or at least reduced. Furthermore, a rapid response to changes in ambient light is ensured, as the next scene will have an ambient light adjustment adapted to the actual ambient light conditions.

The above description relates to sensor adaptive ambient light compensation, i.e. ambient light compensation that is automatically adjusted in response to a signal indicative of the intensity of ambient light. Further types of adjusting brightness and/or color of the displayed image may be available. For example, the DM module 106, 206, 306 and/or display controller 216, 316 may allow a user to manually set a brightness level and/or color settings. In an embodiment, the DM module 106, 206, 306 does not restrict said further types of adjusting brightness and/or color to scene changes, e.g. a brightness setting may be adjusted by a user mid-scene.

Optionally, a form of temporal smoothing may be applied to the signal 112, 212, 312 of the sensor 104, 204, 304, while at the same time restricting adjustment of the ambient light compensation to scene changes as described above. In an embodiment, a temporal smoothing filter is applied to the signal indicative of intensity of ambient light, wherein the filter is reset in response to determining that the current video frame immediately follows a scene change. For example, the smoothing filter comprises a moving average filter, a weighted moving average filter, an exponential smoothing filter. Resetting the filter may include clearing previously stored values of the filter, e.g. setting these values to zero or to the current measured value.

For example, a cumulative average filter is implemented as:

$$y(n)=y(n-1)+I(n),$$

wherein I(n) denotes the ambient intensity measured by the sensor at discrete time instance n, and y(n) denotes the cumulative average, wherein y(0) may be initialized to I(0). In this example, in response to determining that the current video frame immediately follows a scene change, y(n) is reset to I(n).

FIGS. 1A-C show exemplary display apparatus for ambient light compensation. However, the present disclosure is not limited to these examples. In particular, additional components of display apparatuses that are not relevant to ambient light compensation have not been described.

Figure 2:
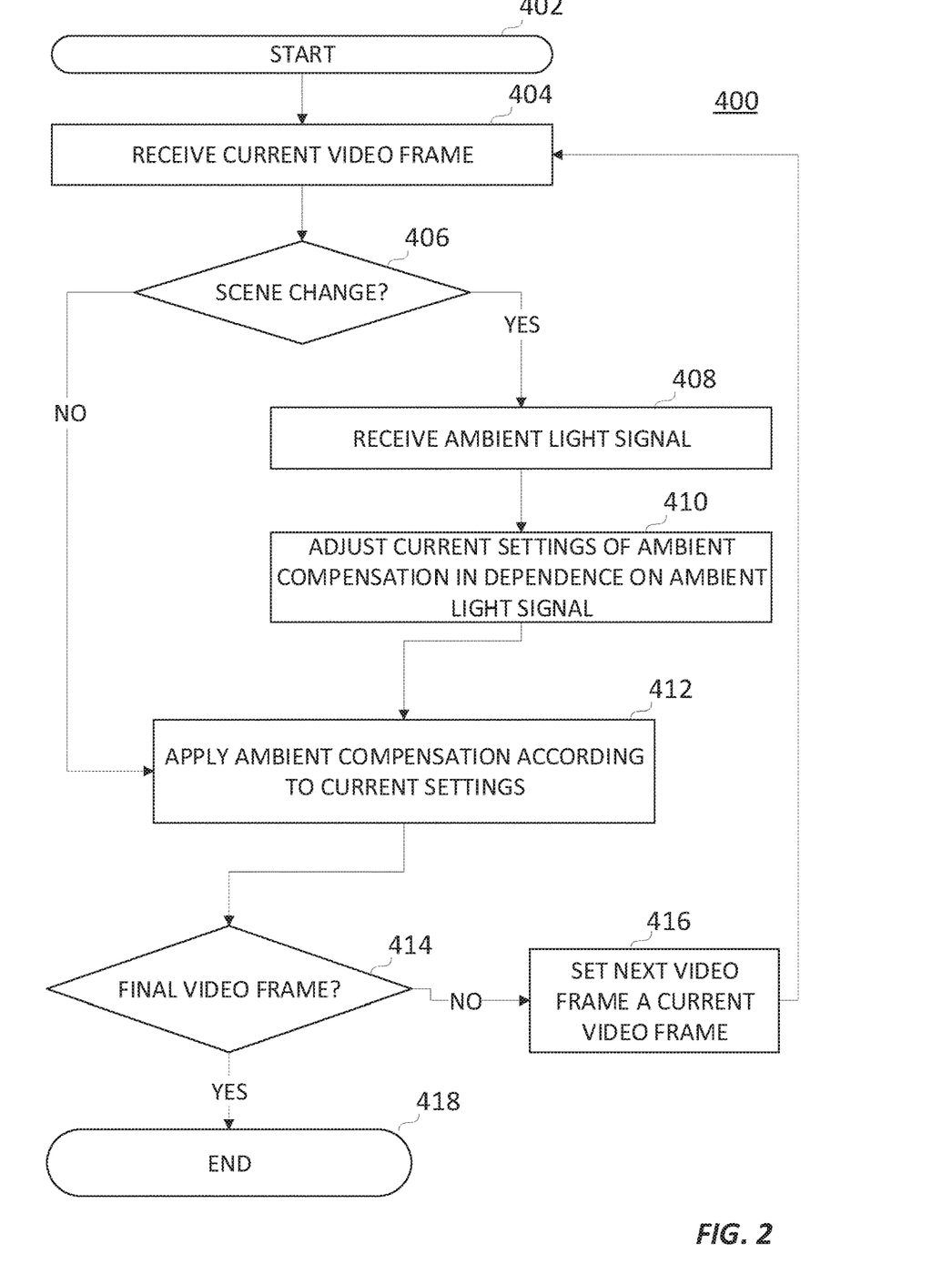
FIG. 2 shows a flow diagram of an example of a method for applying ambient light compensation.

FIG. 2 illustrates a method for applying ambient light compensation. This method may be implemented by a display apparatus. In an embodiment, the method is executed by a display management module of a display apparatus. For example, the method may be executed by any of the DM modules 106, 206, 306 described above.

The method starts at step 402. A current video frame of a sequence of video frames is received in step 404. It is determined whether a scene change has occurred 406. In particular, in step 406 it is determined whether the current frame immediately follows a scene change, which will be described in more detail with respect of FIGS. 3A and 3B.

In response to determining that the current video frame immediately follows a scene change, the method moves to step 408, wherein an ambient light signal is received. The ambient light signal comprises at least an indication of intensity of ambient light. Optionally, the ambient light signal further includes an indication of color of ambient light. In step 410, the current settings of ambient light compensation are adjusted in dependence on the ambient light signal received in step 408. The method then moves to step 412, wherein the current settings of the ambient light compensation—updated in step 410—are applied.

In response to determining that the current video frame does not immediately follow a scene change, the method moves from step 406 to step 412. In such case, the settings for ambient light compensation are not adjusted, i.e. the previous settings for ambient light compensation are maintained. Therefore, in this case, at least the step 410 is omitted. At step 412, the current settings are applied, which in this scenario are the same ambient light settings as for the previous frame.

After step 412, it is determined whether the current frame is the final video frame in step 414. If it is not, i.e. a next video frame is available, the next video frame is set as the current video frame and the method loops back to step 404. If the current frame is the final video frame, the method ends at step 418.

In the example of FIG. 2, step 408 is performed immediately prior to step 410. However, step 408 may alternatively be performed between steps 404 and 406. In another example, step 408 is performed prior to step 404, as a first step of the illustrated loop over the video frames, followed by step 404.

Figure 3A:
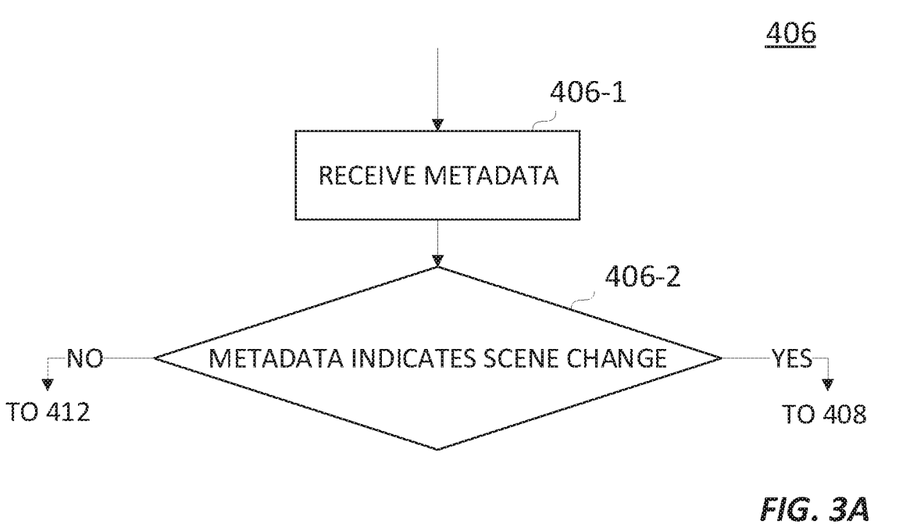
FIG. 3A-B show flow diagrams of examples of determining whether a video frame follows a scene change.

FIG. 3A shows a first example of sub-steps of step 406, i.e. the step of determining whether the current video frame immediately follows a scene change. In the example of FIG. 3A, metadata is received in sub-step 406-1. The metadata includes metadata indicative of a scene change. In an example, the metadata indicative of a scene change comprises a frame-by-frame flag indicating whether the current frame starts a new scene. In sub-step 406-2, the method determines whether the flag is set, i.e. whether the current frame starts a new scene. In response to determining that the flag is set, the method continues to step 408 as described above. In response to determining that the flag has not been set, the method continues to step 412 as described above. In another example, the metadata indicative of a scene change comprises a frame-by-frame identifier for a scene to which the current frame is associated. For example, the identifier may comprise a unique numeric, alphabetic or alphanumeric identifier to identify different scenes. In such a scenario, step 406-2 compares the identifier of the current video frame to the identifier of the previous video frame, i.e. the video frame immediately preceding the current video frame. If it is determined that the current video frame and the previous video frame have the same scene identifier, i.e. they are associated to the same scene, the metadata thus indicates that no scene change has occurred, and the method continues to step 412. If it is determined that the current video frame and the previous video frame have a different scene identifier, i.e. they are associated with different scenes, the method continues to step 408.

Figure 3B:
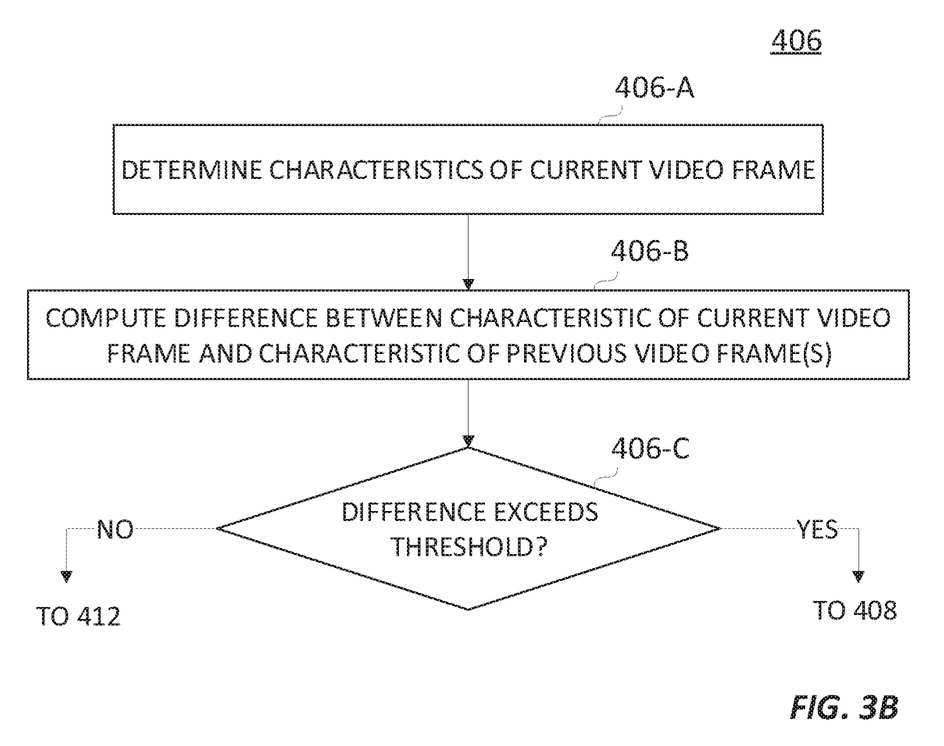

FIG. 3B shows a second example of sub-steps of step 406. In sub-step 406-A characteristics of the current video frame are determined. For example, brightness characteristics of the current video frame are determined. For example, a mid or average luminance value for the current video frame may be computed, or extracted from metadata, as described above.

In sub-step 406-B the difference between one or more characteristics of the current video frame and the same one or more characteristics of at least one previous video frame is calculated. For example, the difference between a mid luminance of the current video frame and the mid luminance of the previous video frame is computed. In another example, the difference between a characteristic of the current video frame and an average (or weighted average) of the same characteristic of N previous video frames is computed, e.g. the difference between the mid luminance of the current video frame and an average (or weighted average) of the mid luminances of N previous frames.

In step 406-C, it is determined whether the difference computed in step 406-B satisfies a threshold condition. In the example shown, it is determined whether the difference exceeds a threshold. In response to determining that the difference exceeds the threshold, the method proceeds to step 408. In response to determining that the difference does not exceed the threshold, the method proceeds to step 412.

In another embodiment, the same functionality is implemented by determining whether the difference is smaller than a threshold. In response to determining that the difference is smaller than the threshold, the method proceeds to step 412. In response to determining that the difference is not smaller than the threshold, the method proceeds to step 408.

As described above, the DM module 106, 206, 306 applies ambient light compensation to the input video signal 108, 208, 308 in dependence on the ambient light intensity. For example, applying ambient light compensation comprises adjusting brightness as a function of ambient light intensity, wherein brightness is increased as ambient light intensity increases. Let $v_{ij}$ denote a luma component of a video frame j having P pixels i=0 ... P−1, and let I denote the ambient light intensity. Then an output video frame may be computed as: $\hat{v}_{ij}=v_{ij}+f(I)$, wherein $f(I)$ denotes a function of ambient light intensity. Herein, the ambient light intensity I is computed on the basis of the signal 112, 212, 312 received from the ambient light sensor 104, 204, 304. For example, the signal may be temporally smoothed as described above to obtain the ambient light intensity. The function $f(I)$ can take on both negative and positive values. For example, when the input video signal is authored in a 5 nits reference environment, $f(I)$ may take on negative values for values of I corresponding to an ambient light intensity of less than 5 nits, while $f(I)=0$ for I values corresponding to an ambient light intensity of 5 nits and $f(I)>0$ for I values corresponding to ambient light intensities exceeding 5 nits. The function $f(I)$ may be a linear or a non-linear function.

In an embodiment, applying ambient light compensation comprises adjusting brightness as a function of both the ambient light intensity and the intensity values of the input video frames, e.g. the pixel values of the luma component of the input video frames. Again, $v_{ij}$ denotes the luma component of a video frame j having P pixels i=0 ... P−1, and I denotes the ambient light intensity. Then an output video frame may be computed as: $\hat{v}_{ij}=g(v_{ij},I)$, wherein $g(v_{ij},I)$ denotes a function of both ambient light intensity and luma value of pixel i of frame j.

In an embodiment, the function $f(I)$ or $g(v_{ij},I)$ is implemented as a look up table (LUT).

Figure 4:
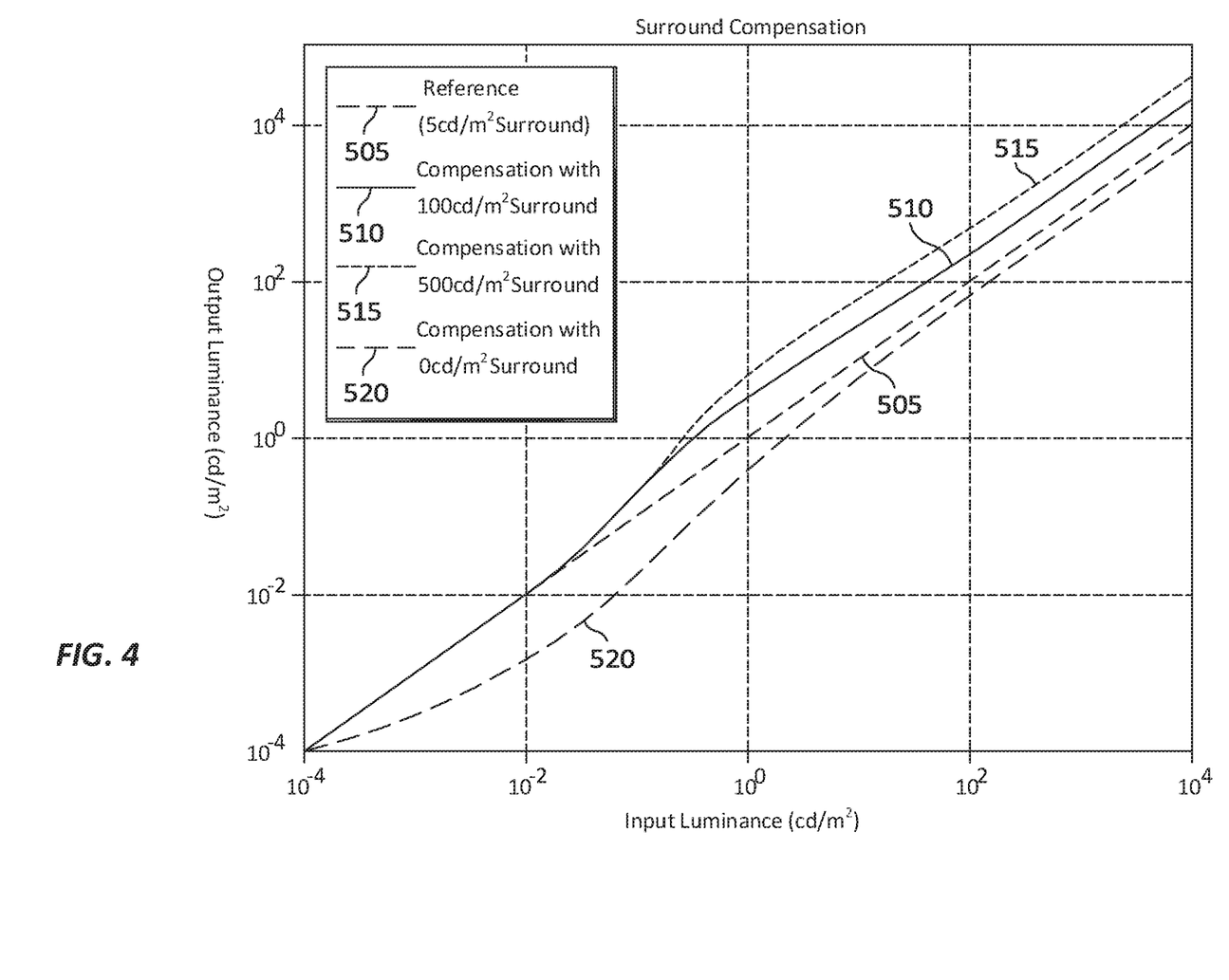
FIG. 4 shows example functions for ambient light compensation.

FIG. 4 shows an example of a function $g(v_{ij},I)$ for four different levels of ambient light intensity I. In the graphs of FIG. 4, the abscissa shows the input luminance expressed in units of candela per squared meter, which has a one to one correspondence to the input luma values $v_{ij}$. The ordinate shows the output luminance expressed in units of candela per squared meter, which has a one to one correspondence to output luma values $\hat{v}_{ij}$. The figure shows the relation between input luminance and output luminance at 5 nits (405), 100 nits (410), 500 nits (415), and zero nits (420).

As depicted in FIG. 4, when the viewing environment matches the reference environment (e.g., 5 nits), function 505 represents a straight line with slope=1, i.e. no ambient compensation is applied. For darker (e.g. function 520) or brighter (e.g. function 510 or function 515) viewing environments, the ambient light compensation is either decreased or increased as needed. As can be seen from FIG. 4, the ambient light compensation is dependent on both the ambient light intensity and the input luminance of the input video frame.

The DM module 106, 206, 306 may have access to a predetermined number of ambient-light compensation mappings, e.g. in the form of one or more LUTs or a 3D LUT, stored internally in display apparatus 100, 200, 300, e.g. stored in a memory of DM module 106, 206, 306. In this example, the DM module 106, 206, 306 may be configured to select one of a set of ambient light compensation mappings in dependence on the signal indicative of intensity of ambient light. For ambient light intensities not represented in the stored LUT(s), interpolation techniques may be applied to derive an appropriate LUT. For example, given pre-computed curves $g(v_{ij}, I_1)$ and $g(v_{ij},I_2)$, for two ambient-light values, $I_1$ and $I_2$, a new curve $g(v_{ij},I)$, for $I_1<I<I_2$ may be generated by interpolating between the $g(v_{ij},I_1)$ and $g(v_{ij},I_2)$ values.

As described above, light sensors for ambient light compensation in a display apparatus are typically positioned on a front side of the display apparatus to obtain a measure of the light intensity that elevates the black level of the displayed image. However, the positioning of the sensor near the front of the display apparatus may cause the sensor to also register some of the light emitted by the display apparatus itself. Therefore, the signal generated by the sensor may not be an accurate measure of the ambient light. Instead, the signal of the sensor is dependent on both the ambient light and the light emitted by the display apparatus. As the light emitted by the display apparatus may change rapidly due to changes in the input video signal, this may also affect the output of the light sensor and—in conventional display apparatuses—may be another cause of the occurrence of flicker. The synchronization of the ambient adjustment to scene changes as described above is also effective in reducing or eliminating flicker caused by the sensor registering light emitted by the display apparatus itself. However, the signal generated by the sensor may be an inaccurate measure of the ambient light intensity. Therefore, the ambient light compensation applied based on the sensor output may increase or decrease the brightness of the displayed image more than necessary in view of the actual ambient light.

LCD displays may blank the screen at regular intervals. Therefore, the above problem of reduced accuracy may be addressed by only taking a measurement from the ambient light sensor during the time the screen is blanked. However, a disadvantage of this approach is that the amount of time the screen would be blanked is relatively short, otherwise average display brightness would suffer. If the screen is off for 10% of the time, then the sensor would only be measuring the ambient light for 10% of the time, and a 10× gain would need to be applied, resulting in more noise in the measurement. This is undesirable, as noise in the output signal of the sensor is a cause of flicker.

The problem of the display apparatus interfering with the measurement of the ambient light sensor increases for increasing brightness. Therefore, the interference is large for HDR display apparatuses that generally have a higher maximum brightness. Nevertheless, the problem is also present in SDR display apparatuses, and the present disclosure is therefore not limited to HDR, but covers both HDR and SDR implementations.

The inventors have realized that the accuracy of the ambient light compensation can be increased, without increasing the occurrence of flicker, by using an ambient light sensor that is less sensitive to light of wavelengths corresponding to primary colors of the display apparatus than to other wavelengths of the visible spectrum.

In order to display color images, display apparatuses comprise pixels in three or more different colors, referred to as primary colors of the display apparatus. For example, a display apparatus may comprise red (R), green (G) and blue (B) pixels. The ambient light sensor, e.g. sensors 104, 204, 304, is of a type that is less sensitive to the primary colors of the display apparatus, e.g. to the wavelengths corresponding to the RGB colors of the pixels of a display apparatus.

Figure 5:
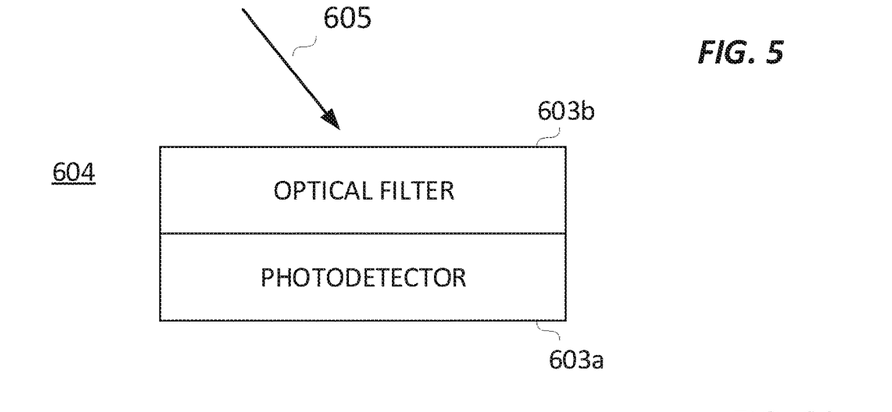
FIG. 5 shows a schematic diagram of an exemplary ambient light sensor.

The embodiment of FIG. 5 shows an example of such an ambient light sensor. The ambient light sensor 604 of FIG. 5 comprises a photodetector 603a and an optical filter 603b. The photodetector 603a may for example comprises a photodiode, a phototransistor, a photoresistor, one or more reverse-biased LEDs, any other suitable type of photodetector. The optical filter 603b reduces or blocks one or more of the primary colors of the display apparatus. For example, the optical filter 603b may be an optical band-stop filter (also known as optical notch filter) that attenuates light of wavelengths corresponding to the primary colors of the display apparatus. In other words, the stopbands of the optical band-stop filter correspond to the spectral power distribution of light emitted by the display apparatus. An example of such sensor characteristic is shown schematically in FIG. 6A. The abscissa corresponds to the wavelength, and the ordinate corresponds to sensor sensitivity. The sensor has generally a flat response across the visible spectrum, with the exception of three notches, each corresponding to one the primaries of the exemplary display apparatus.

Figure 6A:
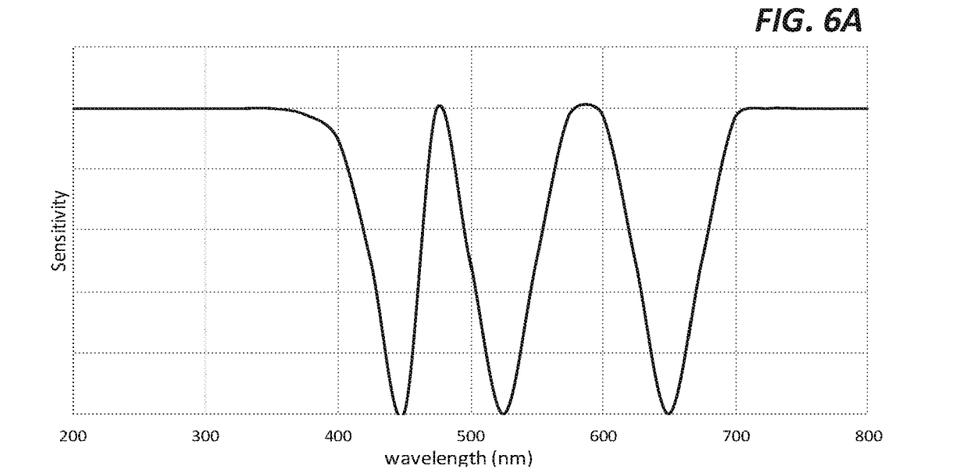
FIG. 6A shows a schematic plot of sensitivity as a function of wavelength for a first exemplary ambient light sensor.
Figure 6B:
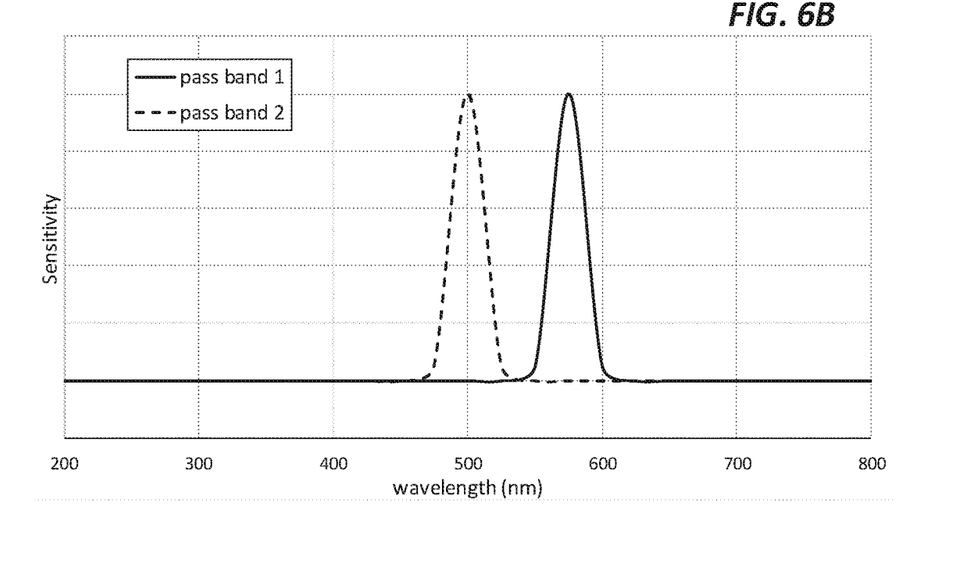
FIG. 6B shows a schematic plot of sensitivity as a function of wavelength for a second exemplary ambient light sensor.

The response of FIG. 6A may for example be realized using an optical band-stop filter as the optical filter 603b. In another example, instead of having a band-stop characteristic as shown in FIG. 6A, a sensor having a band-pass characteristic may be provided, wherein the pass bands of the sensor correspond to bands that do not include the primary colors of the display apparatus. For example, an optical band-pass filter may be provided as optical filter 603b. FIG. 6B shows schematically the sensitivity of a sensor having such band-pass characteristic. The solid line illustrates a first pass band, that corresponds to cyan light, e.g. light of a wavelength of 490-520 nm. The dashed line illustrates a second pass band, corresponding to yellow light, e.g. light of a wavelength of 570-590 nm. The response of the sensor may include only the first pass band, only the second pass band, or may include both the first pass band and the second pass band. For example, the band-pass characteristic of the sensor is realized by using a yellow filter as optical filter 603b, or by using a cyan filter as optical filter 603b, or by using an optical filter 603b that has a dual passband, or by using an optical filter 603b that comprises a mosaic of a yellow optical filter and a cyan optical filter.

In another example, the optical filter 603b may comprise a color filter mosaic comprising a red filter (R), a green filter (G), a blue filter (B), a yellow filter (Y) and a cyan filter (C). This can be labelled a RYGCB sensor. Optionally, a magenta filter (M) is further included. The R, G and B filter of the mosaic correspond to the R, G, B primaries of the display apparatus. For ambient light compensation, only the Y and C pixels of the RYGCB sensor are taken into account, to avoid adjusting the ambient light compensation to light emitted by the display apparatus itself. The R, G and B pixels can be used to determine a color of ambient light, for adjusting the color mapping of the video signal to be displayed. The present disclosure therefore further relates to such a sensor per se: a light sensor comprising an optical filter in the form of a RYGCB mosaic, optionally a RYGCBM mosaic.

Optical filter 603b may thus block or attenuate other wavelengths, e.g. red, green and blue light as used in RGB display apparatuses.

Use of an ambient light sensor that is less sensitive to the primary colors of the display apparatus is particularly effective for a display apparatus including one or more lasers, such as a laser projector, as the laser light sources have a very narrow bandwidth. The laser light impinging on the sensor can thus be filtered out very effectively.

An advantage of using a sensor that is sensitive only to yellow light is that in typical viewing environments the main contribution to the ambient light intensity is emitted by lamps that often emit predominantly yellowish light.

Some displays comprise a blue and yellow phosphor, in which case it is advantageous to use a sensor that is sensitive to cyan light only.

Instead of using an optical filter 603b, an ambient light sensor may be selected that is inherently less sensitive to the primary colors of the display apparatus. For example, the ambient light sensor comprises a light-sensitive semiconductor device (e.g. a photodiode or a reversed biased LED) that has a bandgap corresponding to wavelengths different from the wavelengths of the primary colors of the display apparatus. For example, a semiconductor device having a bandgap corresponding to a wavelength in the yellow part of the spectrum (e.g. 570-590 nm). In another example, two or more light-sensitive semiconductor devices are used, that have different bandgaps, each corresponding to a wavelength different from the wavelengths of the primary colors of the display apparatus. For example, the ambient light sensor comprises a photodiode having a bandgap corresponding to a wavelength in the yellow part of the spectrum (e.g. 570-590 nm) and another photodiode having a bandgap corresponding to a wavelength in the cyan part of the spectrum (e.g. 490-520 nm).

The measures of a) synchronizing the ambient light compensation with scene changes, and b) use of ambient light sensor having a reduced sensitivity to light of wavelengths corresponding to the display apparatus's primary colors have been described above in combination. However, the present disclosure is not limited to such a combination, and the features may be implemented as stand-alone measures. It is noted that in case an ambient light sensor having a reduced sensitivity to the primary colors of the display apparatus is used as a stand-alone measure, i.e. without synchronization of ambient light adjustment with scene change, also the effect of reducing flicker may be achieved, since flicker cause by detecting light emitted by the display apparatus is prevented.

In an embodiment, a display apparatus comprises an ambient light sensor configured to generate a signal indicative of intensity of ambient light, wherein the apparatus is configured to receive an input video signal and apply ambient light compensation to the input video signal in dependence on the signal indicative of the intensity of ambient light, wherein the ambient light sensor is less sensitive to light of wavelengths corresponding to primary colors of the display apparatus than to light of other wavelengths of the visible spectrum.

For example, the display apparatus comprises a projector, such as a laser projector, or a display, such as an LCD or OLED display.

For example, the display apparatus comprises a controller and/or a DM module configured to receive the input video signal and apply ambient light compensation to the input signal in dependence on the signal indicative of the intensity of ambient light.

As described above, by using an ambient light sensor with a reduced sensitivity to the display apparatus's primary colors, interference of light emitted by the display apparatus itself with the measurement performed by the ambient light sensor is avoided or at least reduced. Alternatively or additionally, the apparatus, e.g. the DM module of the apparatus, may be configured to determine an expected measuring bias based on the input video signal and take the expected measuring bias into account when applying ambient light compensation based on the sensors output.

Figure 7:
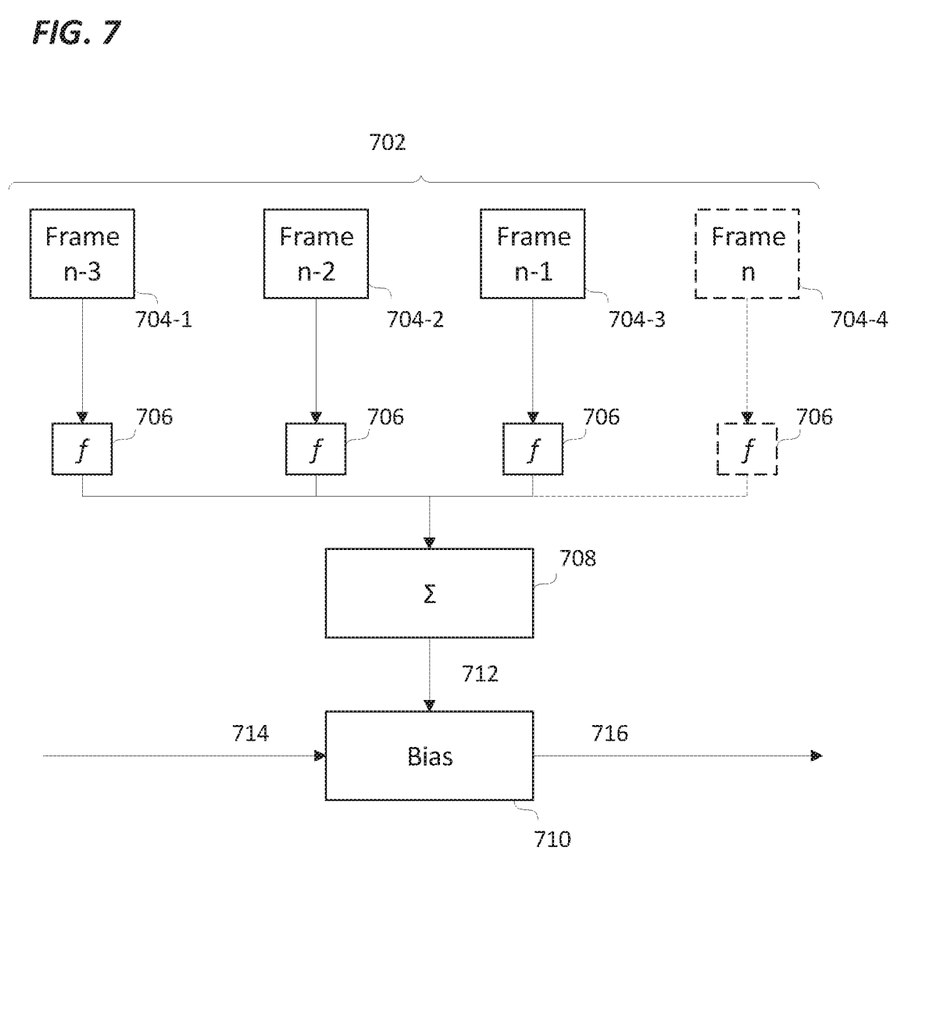
FIG. 7 schematically illustrates adjusting an ambient light signal for a measuring bias caused by detection of light emitted by the display apparatus itself.

FIG. 7 illustrates an example of a process for taking into account an expected measuring bias caused by the sensor registering light emitted by the display apparatus itself. The input video signal 702 comprises a sequence of video frames 704-1 to 704-4. The current frame is depicted as "Frame n", and three preceding video frames are depicted as "Frame n−3", "Frame n−2" and "Frame n−1", respectively. The input video signal 702 may further comprise metadata (not shown), such as frame-based metadata and/or scene-based metadata, as described above in more detail.

An operation $f$ is executed for each video frame 704 by function block 706, to extract a measure of the overall intensity level of each video frame. The function block 706 is the same for each video frame 704, so that the operation $f$ is also the same for each video frame 704. The operation $f$ may be performed on the image data of each video frame or on the metadata of the video frame. For example, the operation $f$ may analyze pixel intensity values of the image data to determine an overall intensity level of the video frame 704. In another example, the operation fuses frame metadata, such as the $S_{min}$, $S_{mid}$ or $S_{max}$ metadata described above, to determine an overall intensity level of the video frame 704. The result of operation $f$ is a scalar that is indicative of the overall intensity level of the corresponding video frame.

For example, overall intensity of a video frame 704 may be calculated as the average pixel intensity values of said video frame. Let P denote the number of pixels in each frame, i denote a pixel index with 0≤i<P, and $L_i$ denote a pixel intensity value. Then in this example:

$$I = \frac{1}{P}\sum_{i=0}^{P-1} L_i$$

Alternatively, the average intensity of the intensity values of the video frame may be available in the frame metadata, and the operation $f$ extracts said average intensity from the metadata of each frame.

In another example, the overall intensity of a video frame 704 is calculated as the mean or median of the pixel intensity values of said video frame. In yet another example, the overall intensity of a video frame 704 is calculated as the average of the maximum pixel intensity value and the minimum pixel intensity value of the video frame:

$$I = \frac{1}{2}(\max(L_i) + \min(L_i))$$

Alternatively, $\max(L_i)$ or $\min(L_i)$ may be available in the frame metadata, and the operation $f$ extracts those values from the metadata, and their sum is computed and divided by two. In another example, instead of calculating the average of the max and min, the operation extracts an $S_{mid}$ value directly from the frame metadata.

The term pixel intensity value refers to a per pixel measure for the intensity of said pixel. For example, a pixel intensity value may correspond to a pixel value of a luma component of the image data. In another example, a pixel intensity value is calculated from the pixel values of the image data, e.g. in an RGB image the intensity value of the pixel may be calculated as a linear combination of the R, G and B pixel values.

In block 708, an expected measuring bias 712 is computed, which includes the step of summing the intensity levels generated by blocks 706. In an embodiment, the expected measuring bias 712 simply corresponds to the computed sum, as illustrated by the sigma sign in block 708. In another embodiment, the expected measuring bias 712 is computed by dividing the sum by the number of video frames 704 used in the calculation, to obtain an average of the intensities of the video frames 704. In another embodiment, the expected measuring bias 712 is computed by calculating a linear combination of the intensities of the video frames 704, e.g. a weighted average. For example, a weighted average that has greater weighting factors for the intensities of more recent video frames (e.g. 704-3) than for older video frames (e.g. 704-1).

The measuring bias 712 calculated in block 708 is used in function block 710 to adjust an ambient light intensity value 714 that is based on the measurement performed by the ambient light sensor. The measured value 714 may be obtained directly from the ambient light sensor or preprocessing steps such as analog-to-digital conversion, scaling or offsetting may be performed on the sensor's signal to convert it into the measured value of ambient intensity 714. In block 710 the measured value 714 is adjusted by compensating for the expected measuring bias 712 as determined based on the input video signal 702. The output of block 710 is a corrected value for the ambient light intensity, on which subsequent ambient light compensation is to be based.

For example, the compensation performed in block 710 may comprise subtracting the expected measuring bias 712 from the measured value 714: $I_{corrected}=I_{measured}-I_{bias}$. In another example, the compensation performed in block 710 includes scaling the expected bias before subtracting: $I_{corrected}=I_{measured}-a*I_{bias}$. For example, $0<a\leq 1$. In another example, the expected bias determined in block 708 is converted via a second order polynomial before subtracting: $I_{corrected}=I_{measured}-(\alpha I_{bias}^2+\beta I_{bias}+\gamma)$. In yet another example, the expected bias determined in block 708 is converted via a LUT before subtracting from $I_{measured}$. In yet another example, the compensation performed in block 710 uses a 2D look-up table (LUT) to convert the data pair ($I_{measured}$, $I_{bias}$) into a corrected intensity value $I_{corrected}$.

For example, the scaling factor a, the parameters $\alpha$, $\beta$, $\gamma$, the LUT or the 2D LUT may be determined using a calibration procedure. In a first step of the calibration procedure, the display apparatus is configured to display a test image with minimal light emission. For example, the display apparatus is configured to display a black image. In an example of a display apparatus having a display with a backlight, the backlight may be switched off for said first step of the calibration procedure. The response from the ambient light sensor is measured. In a second step of the calibration procedure, that can be performed prior or after the first step, at least one test image is displayed, and the response from the ambient light sensor is measured. For example, a series of test images is displayed in sequence, each of the test images having a different overall intensity. The first step and second step are performed within a relatively small timeframe, not exceeding 2-3 minutes, but typically less than 30 s. Therefore, the difference in the sensor output when displaying a black image and the sensor output when displaying a test image can be mainly attributed to the sensor registering the light emitted by the display apparatus itself. In an embodiment, said difference is calculated to obtain a calibrated bias level for each test image. Each test image has a known overall intensity. Therefore, a LUT can be constructed that relates the overall intensity of an image shown on the display apparatus to a calibrated sensor bias. In an example, interpolation is used to obtain further entries of the LUT. Additionally or alternatively, a function may be fitted to the measured pairs of overall image intensity and bias value, e.g. to obtain the parameters a, $\alpha$, $\beta$ or $\gamma$ described above. Instead of measuring with a black screen once and subsequently measuring a series of test images, in an embodiment measuring with a black screen is alternated with measuring one or more test images.

In the example of FIG. 7, the current video frame "Frame n" is also used for computing the sum in block 708. However, as indicated by the dashed lines, including "Frame n" is optional, and in some embodiments the computation is based only on video frames that precede the current video frame. In the shown example, the summation is performed over four frames, but the present disclosure is not limited to summing over four frames. In an embodiment, the predetermined number of video frames to use for calculating a measuring bias may be in the range of 2-120 video frames, e.g. in the range of 30-90 video frames. Further, in the illustrated example the computation is performed on consecutive video frames. However, the present disclosure is not limited to using consecutive video frames for the computation of a measuring bias, e.g. every other video frame may be used.

The predetermined number of video frames used in the computation corresponds to a certain time duration. For example, at 60 frames per second, 60 video frames correspond to a time duration of 1 second. In an embodiment, the predetermined number of video frames to be used in the computation (and optionally also during calibration) corresponds to a time duration in the order of the sensor's integration constant. Typical values for the time duration are 0.01-2 seconds, e.g. 0.5-1.5 seconds.

Embodiments described herein may be implemented in hardware, software, firmware and combinations thereof. For example, embodiments may be implemented on a system comprising electronic circuitry and components, such as a computer system. Examples of computer systems include desktop computer systems, portable computer systems (e.g. laptops), handheld devices (e.g. smartphones or tablets) and networking devices. Systems for implementing the embodiments may for example comprise at least one of an integrated circuit (IC), a programmable logic device (PLD) such as a field programmable gate array (FPGA), a digital signal processor (DSP), an application specific IC (ASIC), a central processing unit (CPU), and a graphics processing unit (GPU).

Certain implementations of embodiments described herein may comprise a computer program product comprising instructions which, when executed by a data processing system, cause the data processing system to perform a method of any of the embodiments described herein. The computer program product may comprise a non-transitory medium storing said instructions, e.g. physical media such as magnetic data storage media including floppy diskettes and hard disk drives, optical data storage media including CD ROMs and DVDs, and electronic data storage media including ROMs, flash memory such as flash RAM or a USB flash drive. In another example, the computer program product comprises a data stream comprising said instructions, or a file comprising said instructions stored in a distributed computing system, e.g. in one or more data centers.

The present disclosure is not restricted to the embodiments and examples described above. Numerous modifications and variations can be made without departing from the scope of the present disclosure, defined by the accompanying claims.

Various aspects of the present disclosure may be appreciated from the following enumerated example embodiments (EEEs):

EEE 1. A display apparatus, comprising:
an ambient light sensor configured to generate a signal indicative of intensity of ambient light,
wherein the display apparatus is configured to:
receive an input video signal; and
applying ambient light compensation to the input video signal in dependence on the signal indicative of the intensity of ambient light, wherein the ambient light sensor is less sensitive to light of wavelengths corresponding to primary colors of the display apparatus than to light of other wavelengths of the visible spectrum.

EEE 2. The display apparatus according to EEE 1, wherein the ambient light sensor comprises an optical filter that attenuates light of wavelengths corresponding to primary colors of the display apparatus.

EEE 3. The display apparatus according to EEE 2, wherein the optical filter comprises an optical band-stop filter.

EEE 4. The display apparatus according to EEE 1, wherein the ambient light sensor is sensitive only to one or more bands within the visible spectrum.

EEE 5. The display apparatus according to EEE 4, wherein the ambient light sensor is sensitive only to yellow light.

EEE 6. The display apparatus according to EEE 4, wherein the ambient light sensor is sensitive only to cyan light.

EEE 7. The display apparatus according to EEE 4, wherein the ambient light sensor is sensitive only to yellow light and cyan light.

EEE 8. The display apparatus according to any of EEEs 4-7, wherein the ambient light sensor comprises an optical band-pass filter.

EEE 9. The display apparatus according to any of EEEs 1-8, further comprising a display, wherein the display apparatus is configured to transform the input video signal to an output video signal adapted for the display, comprising said applying ambient light compensation to the input video signal in dependence on the signal indicative of the intensity of ambient light, and wherein the display is configured to display the output video signal.

EEE 10. The display apparatus according to any of EEEs 1-8, further comprising a projector, wherein the display apparatus is configured to transform the input video signal to an output video signal adapted for the projector, comprising said applying ambient light compensation to the input video signal in dependence on the signal indicative of the intensity of ambient light.

EEE 11. The display apparatus of EEE 10, wherein the projector is a laser projector.

EEE 12. A display apparatus, comprising:
an ambient light sensor configured to generate a signal indicative of intensity of ambient light,
wherein the display apparatus is configured to:
receive an input video signal; and
applying ambient light compensation to the input video signal in dependence on the signal indicative of the intensity of ambient light,
wherein the display apparatus is further configured to determine, based on at least one of the input video signal and metadata related to the input video signal, a measuring bias due to the light emitted by the display apparatus and registered by the ambient light sensor, and
wherein applying ambient light compensation comprises: applying ambient light compensation to the input video signal in dependence on the signal indicative of the intensity of ambient light compensated by the determined measuring bias.

EEE 13. The display apparatus of EEE 12, wherein determining the measuring bias comprises:
determining an intensity level of each of a predetermined number of video frames preceding the current video frame; and
determining the sum of the intensity levels of said predetermined number of video frames.

EEE 14. The display apparatus of EEE 12 or EEE 13, further comprising a display, wherein the display apparatus is configured to transform the input video signal to an output video signal adapted for the display, comprising said applying ambient light compensation to the input video signal in dependence on the signal indicative of the intensity of ambient light, and wherein the display is configured to display the output video signal.

EEE 15. A method for applying ambient light compensation, comprising:
receiving an input video signal comprising a sequence of video frames;
receiving a signal indicative of intensity of ambient light from an ambient light sensor;
determine whether a current video frame of the sequence of video frames immediately follows a scene change; and
transforming the input video signal to an output video signal adapted for a target display apparatus, comprising applying ambient light compensation to the input video signal in dependence on the signal indicative of the intensity of ambient light,
the method further comprising:
determining, based on at least one of the input video signal and metadata related to the input video signal, a measuring bias due to the light emitted by the display apparatus and registered by the ambient light sensor,
wherein applying ambient light compensation comprises: applying ambient light compensation to the input video signal in dependence on the signal indicative of the intensity of ambient light compensated by the determined measuring bias.

EEE 16. The method of EEE 15, wherein determining the measuring bias comprises:
determining an intensity level of each of a predetermined number of video frames preceding the current video frame; and
determining the sum of the intensity levels of said predetermined number of video frames.

EEE 17. A display apparatus, comprising:
an ambient light sensor configured to generate a signal indicative of intensity of ambient light; and
display management module configured to:
receive an input video signal comprising a sequence of video frames;
determine whether a current video frame of the sequence of video frames immediately follows a scene change; and
applying ambient light compensation to the input video signal in dependence on the signal indicative of the intensity of ambient light,
wherein the display management module is configured to adjust said ambient light compensation applied to the input signal in dependence on the signal indicative of intensity of ambient light only in response to determining that the current video frame of the sequence of video frames immediately follows a scene change.

EEE 18. The display apparatus according to EEE 17, wherein the display management module is configured to receive metadata related to the sequence of video frames, including metadata indicating a scene change, and the display management module is configured to determine whether the current video frame immediately follows a scene change using the metadata indicating the scene change.

EEE 19. The display apparatus according to EEE 17, wherein the display management module is configured to compare characteristics of the current video frame to characteristics of one or more previous video frames to determine whether the current video frame of the sequence of video frames immediately follows a scene change.

EEE 20. The display apparatus according to any of the EEEs 17-19, wherein the ambient light sensor is less sensitive to light of wavelengths corresponding to primary colors of the display apparatus than to light of other wavelengths of the visible spectrum.

EEE 21. The display apparatus according to EEE 20, wherein the ambient light sensor comprises an optical filter that attenuates light of wavelengths corresponding to primary colors of the display apparatus.

EEE 22. The display apparatus according to EEE 21, wherein the optical filter comprises an optical band-stop filter.

EEE 23. The display apparatus according to EEE 22, wherein the ambient light sensor is sensitive only to one or more bands within the visible spectrum.

EEE 24. The display apparatus according to EEE 23, wherein the ambient light sensor is sensitive only to yellow light, only to cyan light, or only to yellow light and cyan light.

EEE 25. The display apparatus according to EEE 23 or 24, wherein the ambient light sensor comprises an optical band-pass filter.

EEE 26. The display apparatus according to any of the EEEs 17-25, wherein applying ambient light compensation comprises applying an ambient light compensation function that maps input intensity values of the video frames of the input video signal to output intensity values of corresponding video frames of the output video signal, wherein the display management module is configured to select one of a set of ambient light compensation functions in dependence on the signal indicative of intensity of ambient light.

EEE 27. The display apparatus according to any of the EEEs 17-26, wherein the display management module is further configured to determine, based on at least one of the input video signal and metadata related to the input video signal, a measuring bias due to the light emitted by the display apparatus and registered by the ambient light sensor, wherein applying ambient light compensation by the display management module comprises: applying ambient light compensation to the input video signal in dependence on the signal indicative of the intensity of ambient light compensated by the determined measuring bias.

EEE 28. The display apparatus according to EEE 27, wherein determining the measuring bias comprises:
determining an intensity level of each of a predetermined number of video frames preceding the current video frame; and
determining the sum of the intensity levels of said predetermined number of video frames.

EEE 29. A display management module configured to:
receive an input video signal comprising a sequence of video frames;
receive a signal indicative of intensity of ambient light;
determine whether a current video frame of the sequence of video frames immediately follows a scene change;
transform the input video signal to an output video signal adapted for a target display apparatus, comprising applying ambient light compensation to the input video signal in dependence on the signal indicative of the intensity of ambient light; and
output the output video signal for use by the target display apparatus;
wherein the display management module is configured to adjust said ambient light compensation applied to the input signal in dependence on the signal indicative of intensity of ambient light only in response to determining that the current video frame of the sequence of video frames immediately follows a scene change.

EEE 30. A method for applying ambient light compensation, comprising:
receiving an input video signal comprising a sequence of video frames;
receiving a signal indicative of intensity of ambient light from an ambient light sensor;
determine whether a current video frame of the sequence of video frames immediately follows a scene change; and
transforming the input video signal to an output video signal adapted for a target display apparatus, comprising applying ambient light compensation to the input video signal in dependence on the signal indicative of the intensity of ambient light,
the method comprising adjusting the ambient light compensation applied in dependence on the signal indicative only in response to determining that the current video frame of the sequence of video frames immediately follows a scene change.

EEE 31. The method of EEE 30, further comprising receiving metadata related to the sequence of video frames, including metadata indicating a scene change, wherein said determining whether the current video frame of the sequence of video frames immediately follows a scene change uses the metadata indicating the scene change.

EEE 32. The method of EEE 30, wherein said determining whether the current video frame of the sequence of video frames corresponds to a scene change comprises automatically detecting the scene change.

EEE 33. The method of EEE 32, wherein automatically detecting the scene change comprises comparing characteristics of the current video frame to characteristics of one or more previous video frames.

EEE 34. Computer program product having instructions which, when executed by a computing device or system, cause said computing device or system to perform the method according to any of the EEEs 15 or 30-33.

EEE 35. A non-transitory computer-readable storage medium having stored thereon computer-executable instruction for executing a method in accordance with any of the EEEs 15 or 30-33.

EEE 36. A display apparatus, comprising:
a display;
an ambient light sensor configured to generate a signal indicative of intensity of ambient light; and
a display management module configured to:
receive an input video signal comprising a sequence of video frames;
determine whether a current video frame of the sequence of video frames immediately follows a scene change; and
transform the input video signal to an output video signal adapted for the display, comprising applying ambient light compensation to the input video signal in dependence on the signal indicative of the intensity of ambient light,
wherein the display is configured to display the output video signal, and wherein the display management module is configured to adjust said ambient light compensation applied to the input signal in dependence on the signal indicative of intensity of ambient light only in response to determining that the current video frame of the sequence of video frames immediately follows a scene change.

EEE 37. The display apparatus according to EEE 36, wherein the display management module is configured to receive metadata related to the sequence of video frames, including metadata indicating a scene change, and the display management module is configured to determine whether the current video frame immediately follows a scene change using the metadata indicating the scene change.

EEE 38. The display apparatus according to EEE 36, wherein the display management module is configured to compare characteristics of the current video frame to characteristics of one or more previous video frames to determine whether the current video frame of the sequence of video frames immediately follows a scene change.

EEE 39. The display apparatus according to any of the EEEs 36-38, wherein the ambient light sensor is less sensitive to light of wavelengths corresponding to primary colors of the display than to light of other wavelengths of the visible spectrum.

EEE 40. The display apparatus according to EEE 39, wherein the ambient light sensor comprises an optical filter that attenuates light of wavelengths corresponding to primary colors of the display.

EEE 41. The display apparatus according to EEE 40, wherein the optical filter comprises an optical band-stop filter.

EEE 42. The display apparatus according to EEE 39, wherein the ambient light sensor is sensitive only to one or more bands within the visible spectrum.

EEE 43. The display apparatus according to EEE 42, wherein the ambient light sensor is sensitive only to yellow light, only to cyan light, or only to yellow light and cyan light.

EEE 44. The display apparatus according to EEE 42 or 43, wherein the ambient light sensor comprises an optical band-pass filter.

EEE 45. The display apparatus according to any of the EEEs 36-44, wherein applying ambient light compensation comprises applying an ambient light compensation function that maps input intensity values of the video frames of the input video signal to output intensity values of corresponding video frames of the output video signal, wherein the display management module is configured to select one of a set of ambient light compensation functions in dependence on the signal indicative of intensity of ambient light.

EEE 46. The display apparatus according to any of the EEEs 36-45, wherein the display management module is further configured to determine, based on at least one of the input video signal and metadata related to the input video signal, a measuring bias due to the light emitted by the display and registered by the ambient light sensor, wherein applying ambient light compensation by the display management module comprises: applying ambient light compensation to the input video signal in dependence on the signal indicative of the intensity of ambient light compensated by the determined measuring bias.

EEE 47. The display apparatus according to EEE 46, wherein determining the measuring bias comprises:
determining an intensity level of each of a predetermined number of video frames preceding the current video frame; and
determining the sum of the intensity levels of said predetermined number of video frames.

EEE 48. A display management module configured to:
receive an input video signal comprising a sequence of video frames;
receive a signal indicative of intensity of ambient light;
determine whether a current video frame of the sequence of video frames immediately follows a scene change;
transform the input video signal to an output video signal adapted for a target display, comprising applying ambient light compensation to the input video signal in dependence on the signal indicative of the intensity of ambient light; and
output the output video signal for use by the target display;
wherein the display management module is configured to adjust said ambient light compensation applied to the input signal in dependence on the signal indicative of intensity of ambient light only in response to determining that the current video frame of the sequence of video frames immediately follows a scene change.

EEE 49. A method for applying ambient light compensation, comprising:
receiving an input video signal comprising a sequence of video frames;
receiving a signal indicative of intensity of ambient light from an ambient light sensor;
determine whether a current video frame of the sequence of video frames immediately follows a scene change; and
transforming the input video signal to an output video signal adapted for a target display, comprising applying ambient light compensation to the input video signal in dependence on the signal indicative of the intensity of ambient light,
the method comprising adjusting the ambient light compensation applied in dependence on the signal indicative only in response to determining that the current video frame of the sequence of video frames immediately follows a scene change.

EEE 50. Computer program product having instructions which, when executed by a computing device or system, cause said computing device or system to perform the method according to the EEE 49.

The invention claimed is:
1. A display apparatus, comprising:
a display configured to display images in response to a first video signal, the display including pixels in three or more primary colors; and
an ambient light sensor configured to generate a signal indicative of intensity of ambient light, the ambient light sensor being in a position to register light emitted by the display in addition to the ambient light;
wherein the display apparatus is configured to:
receive a second video signal; and
generate the first video signal by applying ambient light compensation to the second video signal in dependence on the signal indicative of the intensity of the ambient light;
wherein the ambient light sensor is less sensitive to light of wavelengths corresponding to the primary colors of the display than to light of other wavelengths of visible light; and
wherein the display apparatus is further configured to determine a measuring bias caused by the ambient light sensor registering the light emitted by the display and to take the measuring bias into account when applying the ambient light compensation by:
   calculating a linear combination of overall frame intensity levels of a sequence of video frames; and
   subtracting the linear combination OR a second order polynomial of the linear combination from the signal indicative of the intensity of the ambient light.

2. The display apparatus according to claim 1, wherein the ambient light sensor comprises an optical filter that attenuates light of the wavelengths corresponding to the primary colors of the display.

3. The display apparatus according to claim 1, wherein the ambient light sensor comprises an optical band-stop filter having optical stop bands at the wavelengths corresponding to the primary colors of the display.

4. The display apparatus according to claim 1, wherein the ambient light sensor comprises an optical band-pass filter having one or more pass bands to pass only the other wavelength.

5. The display apparatus according to claim 4,
   wherein the primary colors are red, green, and blue; and
   wherein the ambient light sensor is sensitive only to yellow light.

6. The display apparatus according to claim 4,
   wherein the primary colors are red, green, and blue; and
   wherein the ambient light sensor is sensitive only to cyan light.

7. The display apparatus according to claim 4,
   wherein the primary colors are red, green, and blue; and
   wherein the ambient light sensor is sensitive only to yellow light and cyan light.

8. The display apparatus according to claim 1,
   wherein the display apparatus is configured to transform the second video signal to the first video signal adapted for the display; and
   wherein the display is configured to display images in accordance with the first video signal.

9. The display apparatus according to claim 1, wherein the display apparatus is further configured to synchronize changes in the ambient light compensation with scene changes of the second video signal.

10. A display apparatus, comprising:
   a projector configured to project images in response to a first video signal, the images having pixels in three or more primary colors; and
   an ambient light sensor configured to generate a signal indicative of intensity of ambient light, the ambient light sensor being in a position to register light emitted by the projector in addition to the ambient light;
   wherein the display apparatus is configured to:
      receive a second video signal; and
      generate the first video signal by applying ambient light compensation to the second video signal in dependence on the signal indicative of the intensity of the ambient light;
   wherein the ambient light sensor is less sensitive to light of wavelengths corresponding to the primary colors of the projector than to light of other wavelengths of visible light; and
   wherein the display apparatus is further configured to determine a measuring bias caused by the ambient light sensor registering the light emitted by the projector and to take the measuring bias into account when applying the ambient light compensation by:
      calculating a linear combination of overall frame intensity levels of a sequence of video frames; and
      subtracting the linear combination OR a second order polynomial of the linear combination from the signal indicative of the intensity of the ambient light.

11. The display apparatus of claim 10, wherein the projector is a laser projector.

12. The display apparatus according to claim 10, wherein the display apparatus is further configured to synchronize changes in the ambient light compensation with scene changes of the second video signal.

\* \* \* \* \*